United States Patent
Barnes et al.

(10) Patent No.: US 8,141,384 B2
(45) Date of Patent: Mar. 27, 2012

(54) METHODS OF MAKING LED EXTRACTOR ARRAYS

(75) Inventors: Amy S. Barnes, St. Paul, MN (US);
Anatoly Z. Rosenflanz, Maplewood, MN (US); Catherine A. Leatherdale, St. Paul, MN (US); Andrew J. Ouderkirk, Woodbury, MN (US); Jacqueline C. Rolf, River Falls, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 1014 days.

(21) Appl. No.: 11/381,512

(22) Filed: May 3, 2006

(65) Prior Publication Data
US 2007/0256453 A1    Nov. 8, 2007

(51) Int. Cl.
*C03B 19/09*    (2006.01)
*C03B 29/02*    (2006.01)
*F21V 5/04*    (2006.01)

(52) U.S. Cl. ............ 65/17.3; 65/17.4; 65/102; 362/240; 362/244; 362/249.02; 362/249.06; 362/311.01; 362/311.02; 362/311.15; 362/311.05; 257/88; 257/98

(58) Field of Classification Search .................. 65/17.3, 65/17.6, 64, 65, 102; 362/240, 244, 249.02, 362/249.06, 311.01, 311.02, 311.15, 311.14, 362/311.05; 257/88, 98
See application file for complete search history.

(56) References Cited

U.S. PATENT DOCUMENTS

| | | | | |
|---|---|---|---|---|
| 1,466,973 A | * | 9/1923 | Takanashi | 65/66 |
| 2,150,694 A | | 8/1936 | Morey | |
| 2,174,899 A | * | 10/1939 | Selsky | 428/600 |
| 2,521,846 A | * | 9/1950 | Waylande | 428/34.6 |
| 3,596,136 A | | 7/1971 | Fischer | |
| 3,834,883 A | | 9/1974 | Klein | |
| 3,954,534 A | * | 5/1976 | Scifres et al. | 438/29 |
| 5,300,263 A | * | 4/1994 | Hoopman et al. | 264/2.5 |
| 5,403,773 A | | 4/1995 | Nitta | |
| 5,436,764 A | * | 7/1995 | Umetani et al. | 359/566 |
| 5,660,461 A | * | 8/1997 | Ignatius et al. | 362/241 |
| 5,689,374 A | | 11/1997 | Xu et al. | |
| 5,992,179 A | | 11/1999 | Xu et al. | |
| 6,129,866 A | * | 10/2000 | Hamanaka et al. | 264/1.7 |
| 6,141,991 A | | 11/2000 | Fujimoto et al. | |

(Continued)

FOREIGN PATENT DOCUMENTS

EP    0 905 099    3/1999

(Continued)

OTHER PUBLICATIONS

Rosenflanz et al., Nature 430 (Aug. 12, 2004), pp. 761-764 and supplementary info.

(Continued)

*Primary Examiner* — Jason L. Lazorcik
(74) *Attorney, Agent, or Firm* — Steven E. Skolnick (57) ABSTRACT

A molding operation produces an extractor array by providing a mold having a plurality of cavities therein, each cavity being adapted to form an extractor suitable for coupling to an LED die; filling the mold with a plurality of glass particles; heating the glass particles above glass transition temperatures thereof so that the particles are reshaped to conform to the cavity shapes; and forming a land layer that extends between the cavities. The land layer maintains the extractors in a fixed spatial relationship with each other for subsequent handling or processing, such as a simultaneous polishing operation or in attaching the extractor array to a corresponding LED array.

19 Claims, 3 Drawing Sheets

U.S. PATENT DOCUMENTS

| | | | |
|---|---|---|---|
| 6,156,243 A * | 12/2000 | Kosuga et al. | 264/2.5 |
| 6,254,981 B1 | 7/2001 | Castle | |
| 6,361,718 B1 * | 3/2002 | Shinmo et al. | 264/1.21 |
| 6,624,948 B1 * | 9/2003 | Miller et al. | 359/619 |
| 6,870,311 B2 | 3/2005 | Mueller et al. | |
| 6,892,449 B1 * | 5/2005 | Brophy et al. | 29/827 |
| 6,918,267 B2 | 7/2005 | Hirota et al. | |
| 7,009,213 B2 | 3/2006 | Camras et al. | |
| 7,013,676 B2 | 3/2006 | Fujimoto et al. | |
| 7,069,746 B2 * | 7/2006 | Oswald et al. | 65/17.3 |
| 7,091,661 B2 | 8/2006 | Ouderkirk | |
| 7,423,297 B2 * | 9/2008 | Leatherdale et al. | 257/98 |
| 7,819,550 B2 * | 10/2010 | Anderson et al. | 362/237 |
| 2002/0030194 A1 | 3/2002 | Camras et al. | |
| 2003/0066312 A1 | 4/2003 | Sakai et al. | |
| 2003/0126803 A1 | 7/2003 | Rosenflanz | |
| 2004/0079114 A1 * | 4/2004 | Aitken et al. | 65/64 |
| 2004/0148967 A1 | 8/2004 | Celikkaya et al. | |
| 2004/0213539 A1 | 10/2004 | Anderson et al. | |
| 2004/0264185 A1 | 12/2004 | Grotsch et al. | |
| 2005/0065012 A1 | 3/2005 | Rosenflanz et al. | |
| 2005/0065013 A1 | 3/2005 | Rosenflanz | |
| 2005/0137076 A1 | 6/2005 | Rosenflanz | |
| 2005/0274145 A1 | 12/2005 | Aitken et al. | |
| 2006/0049421 A1 | 3/2006 | Suehiro et al. | |
| 2006/0091411 A1 | 5/2006 | Ouderkirk et al. | |
| 2006/0091414 A1 | 5/2006 | Ouderkirk et al. | |
| 2006/0091784 A1 | 5/2006 | Connor et al. | |
| 2006/0091798 A1 | 5/2006 | Ouderkirk et al. | |
| 2006/0092532 A1 | 5/2006 | Ouderkirk et al. | |
| 2006/0094340 A1 | 5/2006 | Ouderkirk et al. | |
| 2006/0096321 A1 * | 5/2006 | Quenzer et al. | 65/102 |

FOREIGN PATENT DOCUMENTS

| | | |
|---|---|---|
| JP | 56-125225 | 10/1981 |
| JP | 63-170225 | 7/1988 |
| JP | 07-291640 | 11/1995 |
| JP | 2004-250303 | 9/2004 |
| JP | 2005-247609 | 9/2005 |
| WO | WO 93/21120 | 10/1993 |
| WO | WO 03/011776 | 2/2003 |
| WO | WO 03/023458 | 3/2003 |
| WO | WO 03/073525 | 9/2003 |

OTHER PUBLICATIONS

U.S. Application entitled "Method of Making Ceramic Articles", filed Aug. 2, 2001, having U.S. Appl. No. 09/922,526.

U.S. Application entitled "Al2O3-Rare Earth Oxide-ZrO2/HfO2 Materials, and Methods of Making and Using the Same", filed Aug. 2, 2001, having U.S. Appl. No. 09/922,527.

U.S. Application entitled "Method of Making Ceramic Articles", filed Aug. 8, 2002, having U.S. Appl. No. 10/211,491.

U.S. Application entitled "LED Package with Converging Optical Element", filed May 2, 2006, having U.S. Appl. No. 11/381,324.

U.S. Application entitled "Arrays of Light Emitting Articles and Method of Manufacturing Same", filed Nov. 22, 2005, having U.S. Appl. No. 60/738,896.

U.S. Application entitled "Method of Reshaping a Glass Body", filed May 3, 2006, having U.S. Appl. No. 60/797,847.

U.S. Application entitled "Arrays of Optical Elements and Method of Manufacturing Same", filed Nov. 22, 2005, having U.S. Appl. No. 11/288,071.

U.S. Application entitled "Pavement Marking, Reflective Elements, and Methods of Making Microspheres", filed Nov. 14, 2005, having U.S. Appl. No. 11/273,513.

U.S. Application entitled "LED Extractor Composed of High Index Glass", filed May 3, 2005, having U.S. Appl. No. 11/381,518.

U.S. Application entitled "Ceramics Comprising Al2O3, REO, ZfO2 and/or HfO2, and Nb2O5 and/or Ta2O5 and Methods of Making the Same", filed on Sep. 25, 2006, having U.S. Appl. No. 10/666,212.

* cited by examiner

METHODS OF MAKING LED EXTRACTOR ARRAYS

FIELD OF THE INVENTION

The present invention relates generally to light emitting diodes (LEDs), and in particular to optical components or elements used to extract light generated within an LED die.

BACKGROUND

LEDs are a desirable choice of light source in part because of their relatively small size, low power/current requirements, rapid response time, long life, robust packaging, variety of available output wavelengths, and compatibility with modern circuit construction. These characteristics may help explain their widespread use over the past few decades in a multitude of different end use applications. Improvements to LEDs continue to be made in the areas of efficiency, brightness, and output wavelength, further enlarging the scope of potential end-use applications.

LEDs are typically sold in a packaged form that includes an LED die or chip mounted on a metal header. The header can have a reflective cup in which the LED die is mounted, and electrical leads connected to the LED die. Some packages also include a molded transparent resin that encapsulates the LED die. The encapsulating resin can have either a nominally hemispherical front surface to partially collimate light emitted from the die, or a nominally flat surface. Other materials besides resins have been proposed for the encapsulating body, referred to herein as an encapsulant. For example, U.S. Pat. No. 3,596,136 (Fischer) discusses LEDs having domes made of certain glasses, glasses comprising by weight 19 to 41% arsenic, 10 to 25% bromine, and either 28 to 50% sulfur or 65 to 70% selenium. Fischer reports at least one glass that is yellow in color with a refractive index of about 2.4, another glass that is red in color with a refractive index between 2.5 and 2.7, and still another glass that is black in color with a refractive index of about 2.9.

It is also known to utilize an optical element that is made separately and then brought into contact or close proximity with a surface of an LED die to couple or "extract" light therefrom and reduce the amount of light trapped within the die. Such an element is referred to herein as an extractor. Extractors normally have an input surface sized and shaped to substantially mate with a major emitting surface of the LED die.

LEDs generate light within high refractive index semiconductor materials that make up the die of the LED. If the die is immersed in air, the large refractive index mismatch between the semiconductor and air causes much of the light propagating within the die to be totally internally reflected at the die/air interface. Only light traveling at angles within a relatively narrow escape cone associated with the interface can refract into the air and escape the die. The half-angle of the escape cone is the well-known critical angle for the interface. As a result, much of the light generated by the die is wasted, and the achievable brightness of the LED suffers.

Both encapsulants and extractors can be used to reduce the amount of wasted light and improve brightness. They do this by providing a light-transmissive material at the surface of the LED die whose refractive index (n) is closer to that of the die than air, reducing the refractive index mismatch at the interface and increasing the span of the escape cone. The closer n is to the refractive index of the die, the less light is wasted inside the die, and the brighter the LED can shine.

From a practical standpoint, conventional encapsulants have been successful to only a limited extent in this regard. The encapsulant substantially surrounds the die, and because of this and the large temperature shifts from the heat generated at the die, the encapsulant material is selected not only for its refractive index properties but also for its thermal and mechanical properties to avoid damaging the LED die over many temperature cycles, and for its ability to resist yellowing or other degradation when exposed to the high flux emitted by the die. As a result, most encapsulated LEDs utilize specialized epoxy resins that have a refractive index n of only about 1.4 to 1.6. These values are well above the refractive index of air (n=1), but well below that of most LED dies (n≈2.3 or higher). Thus, there is still room for substantial improvement.

Extractors are currently not as widely used in LEDs as encapsulants, possibly due to additional manufacturing steps needed to first fabricate the extractor and then hold it in position at the LED die, and the associated expense and complexity. These problems are exacerbated by the small sizes involved, with LED dies typically having a characteristic dimension on the order of millimeters or less.

BRIEF SUMMARY

The present application discloses, inter alia, methods of making extractors suitable for use in LED light sources more easily and economically. The methods involve making a plurality of extractors, typically tens or hundreds, simultaneously using a glass molding operation. The molding operation produces an extractor array by providing a mold having a plurality of cavities therein, each cavity being adapted to form an extractor suitable for coupling to an LED die; filling the mold with a plurality of glass particles; heating the glass particles above glass transition temperatures thereof so that the particles are reshaped to conform to the cavity shapes; and forming a land layer that extends between the cavities. The land layer maintains the extractors in a fixed spatial relationship with each other for subsequent handling or processing, such as a simultaneous polishing operation or in attaching the extractor array to a corresponding LED array.

These and other aspects of the present application will be apparent from the detailed description below. In no event, however, should the above summaries be construed as limitations on the claimed subject matter, which subject matter is defined solely by the attached claims, as may be amended during prosecution.

BRIEF DESCRIPTION OF THE DRAWINGS

Throughout the specification, reference is made to the appended drawings, where like reference numerals designate like elements, and wherein.

DETAILED DESCRIPTION OF ILLUSTRATIVE EMBODIMENTS

The following Description describes light emitting diode (LED) light sources and components therefor. In this regard, "light emitting diode" or "LED" refers to a diode that emits light, whether visible, ultraviolet, or infrared. It includes incoherent encased or encapsulated semiconductor devices marketed as "LEDs", whether of the conventional or super radiant variety, and whether of the forward-emitting or side-emitting variety, the latter of which is often advantageous in display applications. If the LED emits non-visible light such as ultraviolet light, and in some cases where it emits visible light, it can be packaged to include an organic or inorganic phosphor (or it may illuminate a remotely disposed phosphor) to convert short wavelength light to longer wavelength visible light, in some cases yielding a device that emits white light. An "LED die" is an LED in its most basic form, i.e., in the form of an individual component or chip made by semiconductor processing procedures. For example, the LED die is ordinarily formed from a combination of one or more Group III elements and of one or more Group V elements (III-V semiconductor). Examples of suitable III-V semiconductor materials include nitrides, such as gallium nitride, and phosphides, such as indium gallium phosphide. Other types of III-V materials can be used also, as might inorganic materials from other groups of the periodic table. The component or chip can include electrical contacts suitable for application of power to energize the device. Examples include solder reflow, wire bonding, tape automated bonding (TAB), or flip-chip bonding. The individual layers and other functional elements of the component or chip are typically formed on the wafer scale, and the finished wafer can then be diced into individual piece parts to yield a multiplicity of LED dies. The LED die may be configured for surface mount, chip-on-board, or other known mounting configurations.

Furthermore, for purposes of this application the following terms will have the indicated meanings, unless clearly indicated otherwise:

"amorphous material" refers to material derived from a melt and/or a vapor phase that lacks any long range crystal structure as determined by X-ray diffraction and/or has an exothermic peak corresponding to the crystallization of the amorphous material as determined by a differential thermal analysis (DTA);

"differential thermal analysis" or "DTA" refers to a procedure that involves measuring the difference in temperature between a sample and a thermally inert reference, such as $Al_2O_3$, as the temperature is raised. A graph of the temperature difference as a function of the temperature of the inert reference provides information on exothermic and endothermic reactions taking place in the sample. An exemplary instrument for performing this procedure is available from Netzsch Instruments, Selb, Germany under the trade designation "NETZSCH STA 409 DTA/TGA". A suitable amount, e.g., 400 mg, of a sample can be placed in a suitable inert holder (e.g. a 100 ml $Al_2O_3$ sample holder) and heated in static air at a suitable rate, e.g. 10° C./minute, from an initial temperature (e.g. room temperature, or about 25° C.) to a final temperature, such as 1200° C.

"glass" refers to amorphous inorganic material exhibiting a glass transition temperature;

"glass-ceramic" refers to a material formed by heat-treating glass, the material being partially or completely crystalline;

"$T_g$" refers to the glass transition temperature as determined by a suitable DTA test; and "$T_x$" refers to the crystallization temperature as determined by a suitable DTA test.

We now turn to the figures, initially showing and describing exemplary LED extractors, extractor/LED die combinations, and arrays thereof. Thereafter, we discuss the preferred method of making LED extractor arrays using moldable glass particles.

LED Extractors and Extractor Arrays

Figure 1:
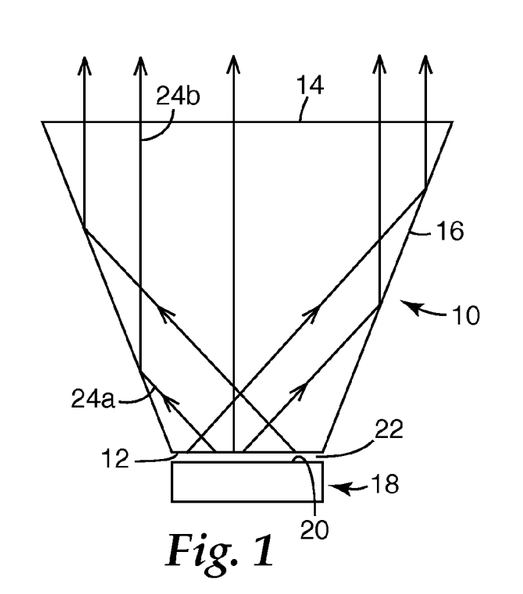
FIG. 1 is a schematic side view of a single LED extractor/LED die combination.

FIG. 1 depicts an LED extractor 10 having an input surface 12, an output surface 14, and a side surface 16. An LED die 18, positioned proximate the input surface 12, emits light from a number of surfaces including a major emitting surface 20. A gap 22 is shown separating the input surface 12 from the emitting surface 20. Whether filled with air or a transparent bonding material or other material, gap 22 is small enough so that the presence of the extractor 10 causes at least some light that would otherwise be totally internally reflected within the LED die 18 to be coupled into the extractor by refraction or frustrated total internal reflection. Typically, the gap 22 is on the order of 100, 50, or 25 nm or less. In other embodiments gap 22 can be substantially eliminated. In either case the input surface 12 is adapted to optically couple to the emitting surface 20 for efficient light transfer from the LED die to the extractor.

For simplicity, LED die 18 is shown generically but can include conventional design features as known in the art. For example, LED die 18 can include distinct p- and n-doped semiconductor layers, buffer layers, substrate layers, and superstrate layers. Although a rectangular LED die arrangement is shown, other known configurations are also contemplated, such as LED dies with angled side surfaces that form a truncated inverted pyramid. Electrical contacts to LED die 18 are not shown for simplicity but can be provided on any of the surfaces of LED die 18 as is known. Preferably, die 18 has a "flip-chip" construction, where electrical contacts are provided on the bottom major surface so that the opposite surface 20 can be made flat without obstructions for convenient mating with input surface 12 of the extractor.

Extractor 10 has an inverted truncated cone shape, but other shapes are also possible. In the schematic view of FIG. 1, side surface 16 can represent a single, tapered surface of revolution, or multiple faceted surfaces that connect input surface 12 to output surface 14. Input surface 12 may be shaped to allow room for electrical contacts that may be present on the emitting surface 20 of the LED die. In many cases, some or substantially all of the emitting surface 20 is flat and polished. In those cases it is also desirable for corresponding portions (including all) of the input surface 12 of the extractor to also be flat and polished, for example, exhibiting a surface roughness less than 50 nm or another specified tolerance. The lateral dimensions and shape of the input surface 12 are also preferably sized to mate with the LED emitting surface, although exact congruence need not be required. To take into account manufacturing tolerances, the extractor input surface may be undersized or oversized relative to the LED emitting surface. For example, the lateral dimensions of the extractor input surface may be as much as 110% or 120%, or as small as 90% or 80%, of the corresponding dimensions of the LED emitting surface. It can also be beneficial to select the dimensions of the extractor such that the maximum lateral dimension of the extractor (whether that occurs at the input surface, the output surface, or an intermediate position) is nominally equal to the corresponding lateral dimension of the LED die. In this approach, described more fully in commonly assigned U.S. Patent Application Publication US 2007/0116423 (Leatherdale et al.), individual LED/extractor pairs can be cut or diced along the same cut line after bonding a disk or body containing a regular array of extractors to a wafer-scale LED array. In still other cases it may be desirable for the input surface of the extractor to be substantially smaller than the output surface of the LED die (e.g. the area of the extractor input surface may be 50% of the area of the LED output surface, or less). See, e.g., U.S. Patent Application Publication US 2006/0091411 (Ouderkirk et al.).

Since extractors are adapted for use with LED dies, and LED dies tend to be no more than a few millimeters in width, the extractors also tend to be relatively small. Without wishing to be limited, extractors commonly have an overall length in a range from 1 to 10, 1 to 5, 1 to 3, or 1 to 2 millimeters, and an overall width in the same range and often smaller than the length.

In operation, light generated within LED die 18 is emitted from emitting surface 20 and passes through gap 22 into extractor 10. Extractor 10 may be bonded to the LED die, for example as described in U.S. Patent Application Publication 2005/0023545 (Camras et al.), or may be in a non-bonded configuration as described in commonly assigned U.S. Pat. No. 7,329,982 (Connor et al.). The materials used in LED die 18 have a high refractive index, which can cause much of the light generated within LED die 18 to undergo total internal reflection at the die surfaces. In order to allow more of this light to escape, emitting surface 20 is optically coupled to input surface 12 of extractor 10. The high refractive index of the material from which extractor 10 is fabricated extracts light from the LED die that would otherwise be lost by total internal reflection. The shape of extractor 10, with input and output surfaces disposed along a central axis of the LED die, where the output surface is wider than the input surface, and with the side surface tapered as shown, at least partially collimates the collected light. FIG. 1 shows a representative obliquely directed ray 24a reflecting at side surface 16 by total internal reflection or otherwise, to produce a reflected ray 24b more closely aligned with the central axis of the LED.

To maximize light extraction efficiency, the refractive index of extractor 10 should closely match the refractive index of emitting surface 20 of LED die 18. But the LED die itself is normally composed of distinct individual layers of different refractive index, for example, epitaxial semiconductor layers disposed on a solid state substrate of SiC, $Al_2O_3$, or another suitable material. In such cases, if the LED die 18 is mounted on a heat sink (not shown) in a face-up configuration, then the emitting surface 20 coincides with an outer surface of one of the semiconductor layers, and the refractive index of the extractor preferably matches the index of the semiconductor. On the other hand if the LED is mounted on the heat sink in a face-down configuration (i.e. epi-down or flip chip), emitting surface 20 coincides with the substrate and the refractive index of the extractor preferably matches the index of the substrate. For $GaN/Al_2O_3$ based high brightness LEDs, the refractive index requirements are between about 1.75 and 2.4. In the case of III-phosphide based semiconductors, the refractive index of the semiconductor layers may be as high as 4.0. High refractive index materials ($n \geq 2$) that have been proposed for use as extractors for LEDs are generally crystalline materials that are difficult to machine or form into the small desired shape, and such processes also tend to be slow and costly.

Figure 2:
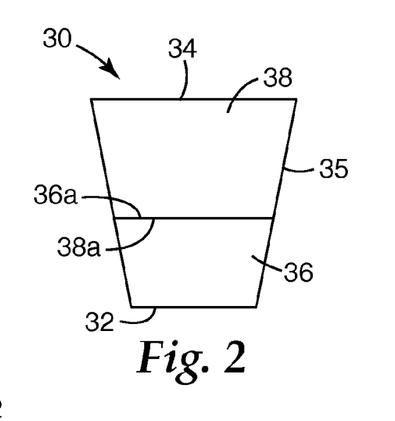
FIG. 2 is a schematic side view of an alternative extractor construction.

FIG. 2 shows a schematic side view of another extractor 30 similar to that of FIG. 1, but where the extractor 30 has a compound configuration that results from the joining of two distinct light-transmissive bodies or structures. Extractor 30 has an input surface 32, an output surface 34, and a tapered side surface 35. The extractor includes distinct optical bodies 36, 38, bonded or otherwise joined together along mating surfaces 36a, 38a, which are preferably but not necessarily flat. Conventional means such as optical adhesives, low $T_g$ sealing glasses, or reaction bonding can be used for joining. The bodies 36, 38 can be made of the same or different light-transmissive materials having similar or different properties. For example, body 38 may be a commercially available optical glass or even a polymer. Preferably, the portion of the extractor closest to the LED die (and containing the input surface) has a higher refractive index than the other portion or portions of the extractor. Thus, in the case of FIG. 2, optical body 36 is preferably composed of a relatively high refractive index glass, and body 38 can be made of another optical glass (or even a polymer) of lower refractive index. The compound construction can also be helpful if a high refractive index optical material exhibits substantial scattering or absorption, such that it would be impractical to use for the entire extractor. Such a material can be used at the input end of the extractor, having a small enough thickness to keep the scattering or absorption to acceptable levels, and then combined with a lower scattering or lower absorption material to complete the extractor. The relative sizes or thicknesses of optical bodies 36, 38 can be selected depending on the optical, mechanical, and thermal properties of the respective optical materials to produce an extractor with acceptable optical, mechanical, and thermal characteristics. Further discussion of compound extractors for LEDs is provided in commonly assigned U.S. Pat. No. 7,304,425 (Ouderkirk et al.).

If desired, the orientation of a tapered extractor can be reversed such that the input surface is larger or wider than the output surface. In such cases the extractor can take the form of a pyramid (whether truncated or non-truncated, and whether having a circular, elliptical, or polygonal base) rather than an inverted pyramid coupled to the LED die as depicted in FIG. 1. Light enters the extractor through the surfaces previously referred to as output surfaces 14, 34, and may exit the extractor through the surfaces previously referred to as input surfaces (12, 32) and through the side surfaces 16, 35. Alternatively, the pyramid can be made to terminate at a point (i.e., be non-truncated), eliminating surfaces 12, 32. Further discussion of such extractor configurations is provided in commonly assigned U.S. Pat. No. 7,525,126 (Leatherdale et al.).

The above embodiments represent only some of a wide variety of possible extractor shapes and constructions. Regardless of which shape or construction is chosen, it is desirable from a manufacturing standpoint to fabricate the extractors in the form of an array. The array permits convenient manipulation, handling, and processing of a large number of the small extractors simultaneously, e.g., where it is desired to polish a surface of the extractors for better coupling to LED dies. The extractors in the array can also be designed with an arrangement and spacing selected to substantially match the arrangement and spacing of an array of LEDs, so that the extractor array can be aligned with and joined to the LED array to produce a large number, preferably tens or hundreds, of LED/extractor pairs simultaneously.

Figure 3:
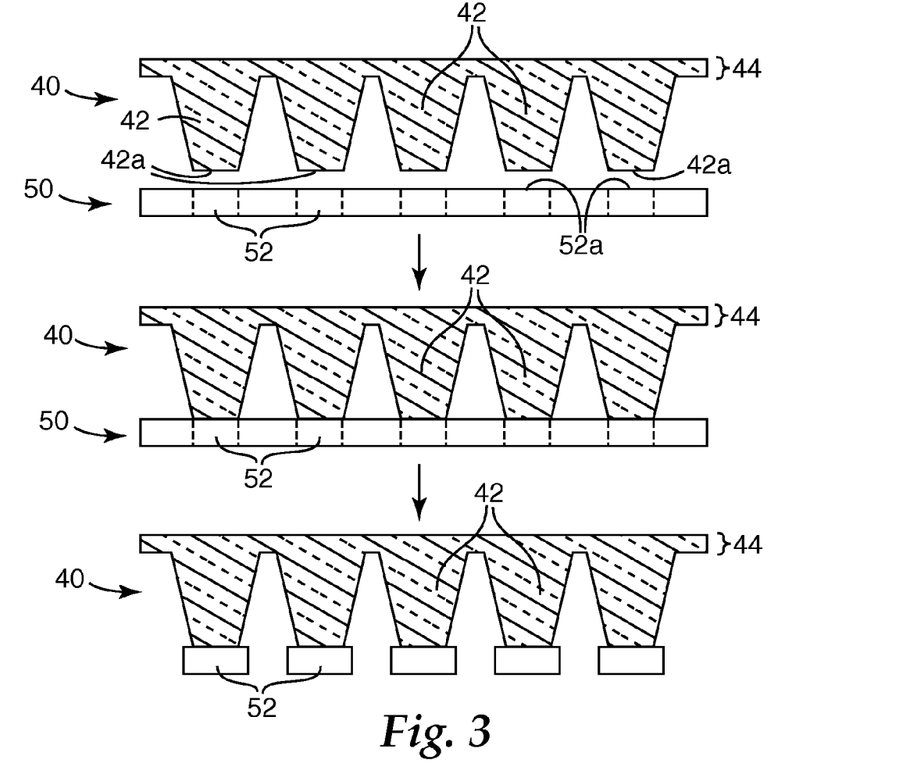
FIG. 3 is a schematic view of an extractor array and a wafer in which LEDs have been formed, the figure also showing a process of simultaneously coupling an array of extractors to an array of LEDs to produce a plurality or array of LED light sources.

FIG. 3 schematically illustrates a representative extractor array 40 and matching LED array 50. Extractor array 40 includes a plurality of extractors 42 that are held together in a fixed spatial relationship, such as with a continuous land layer 44. The fixed spatial arrangement is selected to match the spatial arrangement of LEDs on the LED array 50, discussed below. The extractor array 40 can be a unitary body, wherein extractors 42 and land layer 44 are composed of the same light transmissive material, or it can be non-unitary, where the land layer 44 is composed of a different material (whether light-transmissive or not) than the extractors 42. Furthermore, the extractors 42 themselves may have a compound construction as discussed above. The extractors 42 are shown as tapered shapes similar to extractor 10 of FIG. 1, but they can also represent any of the other extractor shapes and constructions mentioned above. Significantly, the extractors each have an input surface 42a that is adapted to optically couple to an emitting surface of a corresponding LED die. This is preferably accomplished by ensuring the outer dimensions of the extractor input surface are substantially matched to those of the LED emitting surface, and/or by ensuring the contour of the extractor input surface substantially matches the contour of LED emitting surface. Normally the LED emitting surface is flat and smooth within a specified tolerance, and in that case the extractor input surface is also flat and smooth to the same or similar tolerance.

LED array 50 is preferably a solid state wafer that has been fabricated using conventional semiconductor processing procedures to form p-n junctions or the like capable of producing light, such that upon singulation (e.g. by sawing or dicing) individual LED dies 52 having emitting surfaces 52a can be formed. Thus, as discussed above, LED array 50 can include a stack of distinct layers selected for the batch fabrication of LEDs, such as a ceramic or semiconductor substrate, superstrate, epitaxial layers, and/or doped layers. Patterned electrical contacts used to energize the individual LEDs may also be included on the array 50. The LED array 50 can also be referred to as a "wafer", since it is typically thin and relatively rigid, and usually round. The dies 52 can be arranged in any desired fashion over the surface of the wafer, e.g. in an arrangement of rows and columns. Tens or hundreds of individual dies 52 may fit within the area of the wafer. The same number of extractors 42 are therefore preferably provided on extractor array 40.

In the method depicted in FIG. 3, the initially separate arrays 40, 50 are aligned with each other, preferably to provide a one-to-one correspondence of extractors to LED dies. The separate aligned arrays are then joined together, optionally with a suitable light-transmissive bonding material such as an optical adhesive or low $T_g$ sealing glass, or via reaction bonding, or by any other suitable technique. If desired, the wafer or array 50 can then be singulated e.g. by cutting or dicing to reveal the individual LED dies 52. Depending on the intended application, the extractor array 40 can also be singulated so that individual LED die/extractor pairs can be individually mounted on a heat sink or other substrate as desired. Singulation can be by cutting through or breaking the land layer 44, the upper surface of which may become the output surface of the extractors 42. If singulation is accomplished by cutting, the same cutting operation that cuts the LED array 50 can simultaneously cut the extractor array 40 if the extractors are appropriately sized. In an alternative approach, the land layer may simply be removed, e.g. by detachment of the extractors from the land layer if different materials are used for each. Removal of the land layer then exposes an upper surface of the extractors 42, which surface may become the output surface of each extractor depending on its design. In still another approach, the extractor array can be bonded to the LED array with the land layer 44 down, i.e., by rearranging the extractor array and LED array so that the LED emitting surfaces contact the land layer 44 while being aligned with the extractors 42. In that case, the surfaces 42a may become output surfaces and the exposed major surface of the land layer may become the input surface of the extractors.

Method of Making Extractor Arrays

The extractor array is preferably made using a glass particle molding process. In this process, a mold is fabricated to have an array of suitably dimensioned cavities. This mold is then filled with a plurality of glass particles, and the particles are heated above their glass transition temperatures such that the particles are reshaped to conform to the cavities. Optionally, individual glass particles can fuse or coalesce to form larger particles or bodies. The reshaped glass is cooled to form at least portions of extractors, and a continuous land layer is provided that connects the extractors.

In some cases a sufficient amount of glass particles is used to overfill the cavities and form the land layer using the heating and cooling steps. In these cases the land layer and the extractors comprise the same glass material.

In other cases the amount of glass particles is insufficient to form a land layer in the heating and cooling steps, and the land layer is formed separately e.g. by adhering the extractors to a supportive backing prior to removal from the mold. The supportive backing may be or comprise an adhesive-coated film or plate, or a quantity of wax, epoxy, or similar material poured over the extractors and allowed to harden into a solid layer.

In some cases, the mold is initially filled with a first plurality of glass particles, where the amount of such first particles is insufficient to form a land layer after the heating and cooling steps, and where (upon heating) the first particles deform to only partially fill the mold cavities. The mold is subsequently filled with a second plurality of glass particles, the second glass particles having a different composition than the first glass particles, and the amount of the second particles being sufficient to fill the remainder of the mold cavities and form the land layer after a subsequent heating and cooling step.

In any case the extractor array is then removed from the mold while the extractors are connected by the land layer. The land layer preferably keeps the extractors in a fixed spatial relationship with each other. This can be particularly useful for lapping or polishing at least one surface of each of the extractors simultaneously. It can also be particularly useful for efficiently coupling the array of tens or hundreds of extractors to a similarly sized array of LED dies, e.g., LED dies that are still resident on a monolithic solid state wafer. Individual extractors can be singulated or removed from the extractor array after polishing, and/or after coupling to an LED array. Note that the land layer may or may not form a part of the final singulated extractor.

Figure 4:
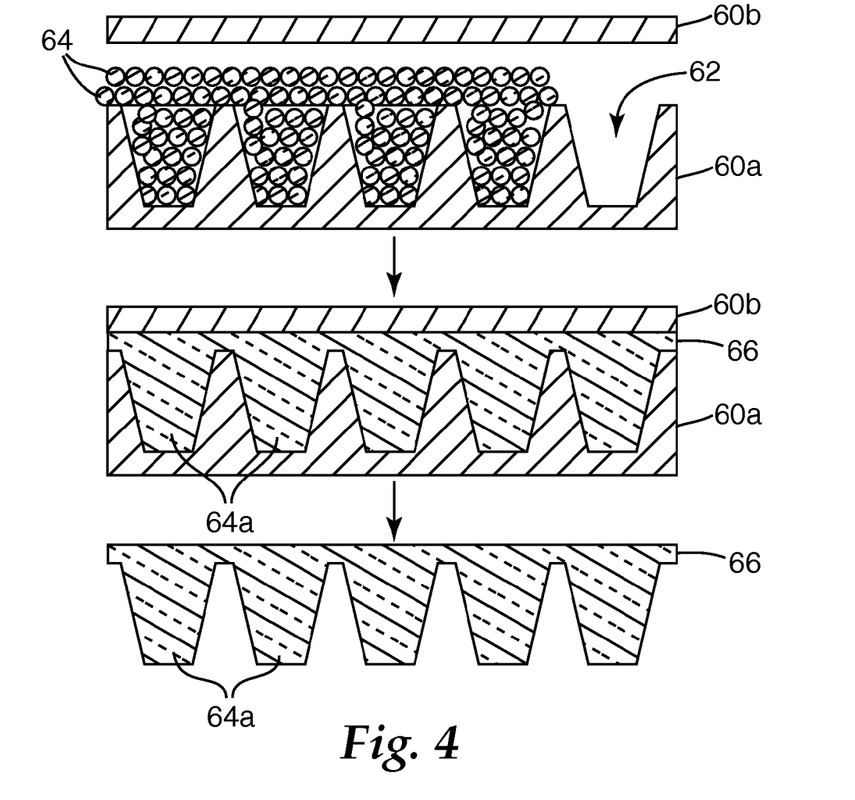
FIG. 4 shows a process that includes the molding of glass beads to produce an extractor array.

FIG. 4 shows a process that includes the molding of glass particles to produce an extractor array.

Initially, a mold 60 is provided that includes a lower mold portion 60a and an optional upper mold portion 60b. The mold is preferably made of a thermally and mechanically robust material that can withstand repeated fabrication cycles. Suitable mold materials include ceramics and refractory metals, such as graphite, alumina, silicon carbide, tungsten carbide, stainless steel, platinum, electroless nickel, and composites thereof. The mold may also be coated with a non-reactive material such as platinum or a precious metal alloy to prevent adhesion of molded glass materials to the mold.

The mold contains a plurality of cavities 62, which cavities preferably define individual volumes having the outer geometry of the desired LED extractors. The cavities can be made by various machining processes, including but not limited to grinding and polishing, electrical discharge machining (EDM), or diamond turning. The cavities may also be made by a stamping process, e.g., stamping the array of cavities into a thin sheet of refractory metal, such as a 0.5 to 1 mm thick layer of stainless steel or platinum. The shape and distribution of the cavities is not limited, and includes geometries that have a flat surface on the top (exposed) face and that do not contain undercuts that inhibit removal of the finished part from the mold. Examples include truncated or non-truncated cones or pyramids, cylinders, wedges, and frustums. Each cavity preferably has a surface (e.g. the bottom surface of cavity 62) or aperture (e.g. the opening at the top of cavity 62) that is sized and/or shaped to substantially match the output area of an LED die. (As noted above, it may be advantageous to deliberately control the size of the extractor input surface to be greater than or less than the size of the LED emitting surface.) Further, some or all of the cavity surfaces can be polished or otherwise made to have an optical quality finish, so that such a finish is also imparted to corresponding surfaces of the completed extractor. In addition to configuring the dimensions of each individual cavity 62, the cavities can be arranged with respect to each other in any desired fashion, but in an exemplary embodiment they are arranged in an array e.g. of rows and columns that substantially mates with an array of LED dies, as depicted in FIG. 3.

After the mold 60 has been prepared, it is filled with a plurality of glass particles 64. In this regard, "filled" means that at least some of the cavities 62, and preferably substantially all of the cavities 62, are either full or only partially full of the particles. The particles 64 may be spherical or nonspherical, as discussed further below. The particles 64 may also have a narrow, uniform size distribution, or may have a wider distribution of (nonuniform) sizes. In FIG. 4, the particles 64 are shown to have an average size or volume that is substantially less than the volume of a given cavity 62. Note that if the cavities 64 have unequal volumes, the average particle size can be substantially less than the average cavity volume. Other cases are discussed below.

The glass particles 64 may be or comprise shards, globules, or beads made from glass feedstock, and/or may comprise molded glass performs. For example, glass feedstock can be made from a suitable mixture of metal oxide powders placed into a crucible and heated and milled into a slurry with homogeneously distributed components. The slurry is then cooled and solidified, and broken down into particles. The particles are subsequently fed into a combustible gas mixed with air or oxygen (e.g., hydrogen/oxygen) torch flame to generated large quantities of melted glass beads. After cooling, such beads can be used as glass particles 64. If desired, the particles can be sized using sieves or the like to provide a uniform or otherwise controlled size distribution.

In an alternative approach, the particles can comprise a conventional glass frit powder, or a homogeneous mix of oxides such as are used in traditional glass manufacturing methods.

The glass composition is not limited and can be any material that substantially transmits light in the wavelength of interest—i.e., the wavelength(s) emitted by the LED die to which the extractor will be coupled—and that is capable of being molded. Preferably, the glass composition has a processing window, characterized by the difference between its crystallization temperature and its glass transition temperature ($T_x - T_g$), of at least 5 degrees C. Conventional glasses of moderate refractive index ($1.5 < n < 2$), and less conventional glasses of higher refractive index ($n \geq 2$ or 2.1 or 2.2 or 2.3), can be used. Exemplary materials include: S-LAH51, S-LAH53, S-LAH63, and S-LAL61 available from Ohara Corporation; P-LASF47, N-LAF34, N-LAF36, and N-LASF46 available from Schott Glass Technologies; BAFD8 available from Hoya Corporation; and glasses disclosed in U.S. Patent Application Publication US 2003/0126803 (Rosenflanz), WIPO Publication WO 03/011776 (Rosenflanz), U.S. Patent Application Publication US 2005/0065013 (Rosenflanz et al.), U.S. patent application Ser. No. 11/273,513 (Frey et al.), filed Nov. 14, 2005, and U.S. Pat. No. 7,423,297 (Leatherdale et al.). Preferably, at least a portion of the extractor is made of a glass having a refractive index of at least 2, or 2.1 or 2.2 or 2.3 or 2.4, but useful embodiments can also be made with glasses of lower refractive index.

After filling the mold with the glass particles 64, the glass particles 64 and also the mold 60 are heated above the glass transition temperature of the glass so that the individual particles 64 soften and deform, coalescing or fusing together to form molten extractors 64a that conform to (at least a portion of) the shape of the cavities 62. As shown, the amount of glass particles may be such that the molten glass overfills the cavities 62, and forms a land layer 66. In some cases, deformation and/or coalescing of the glass particles is promoted by pressure applied to the glass particles between the mold portions 60a, 60b. Some of the glasses mentioned above can be hot pressed at temperatures from 800 to 1000° C. and pressures from 1-10 MPa for a duration of 1-20 minutes. Other glasses have glass transition temperatures commonly around 600° C., and some as low as 360° C., and these can be hot pressed at correspondingly lower temperatures. In either case, the hot pressing can be of the uniaxial or isostatic pressing technique. Note that if a second mold part such as upper mold portion 60b is used, such a part can be provided with a flat surface as shown, or with a non-flat surface (e.g., a pattern of curved surfaces to form a lens-like feature on each extractor, or a faceted surface, or a partially flat and partially curved or faceted surface) to provide a desired profile to one end of the finished extractors, depending on which end of the extractor is intended for coupling to the LED die and the desired contour of the extractor surfaces.

The glass and mold are then cooled to solidify the extractors 64a and land layer 66. The cooling rate is preferably slow enough to avoid fracture resulting from thermal shock of the glass material. If desired, the cooling rate may be slow enough to fully anneal the glass material.

In some cases it may be desirable to form extractors of two or more distinct optical bodies, as discussed in connection with FIG. 2. In that case, the amount of glass particles 64 can be reduced such that the molten glass only partially fills the mold cavities 62 and forms no land layer 66. Thereafter, the partially filled mold can be filled with a plurality of second glass particles, which can be heated above their glass transition temperature and optionally pressed to deform and coalesce the second glass particles to conform to the remaining portions of the mold 60. The second glass material may be sufficient to completely fill the cavities 62, and may also be sufficient to form a land layer similar to layer 66.

If no land layer 66 is formed by the first or second glass particles, or if a land layer is formed but it is too thin or fragile, another layer can be formed over all of the extractors 64a to provide a land layer with sufficient rigidity so that the finished extractors 64a can be removed from the mold while retaining their relative spacings, and manipulated and handled as a group as discussed above. The additional layer may be or comprise an adhesive-coated film or plate, or a quantity of wax, epoxy, or similar material poured over the extractors and allowed to harden into a solid layer.

In any case, after one or more filling, heating, and cooling steps, and providing a land layer as part of such steps and/or in a separate step, all of the solidified extractors 64a are removed from the mold 60a with a land layer 66 that holds and maintains the extractors in fixed relative positions.

Figure 5A:
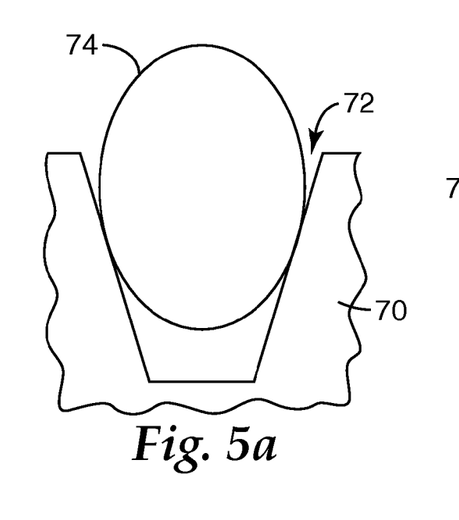
FIG. 5 shows a close-up view of a mold cavity and a glass particle whose size or volume is adequate to substantially fill the cavity after molding.
Figure 5B:
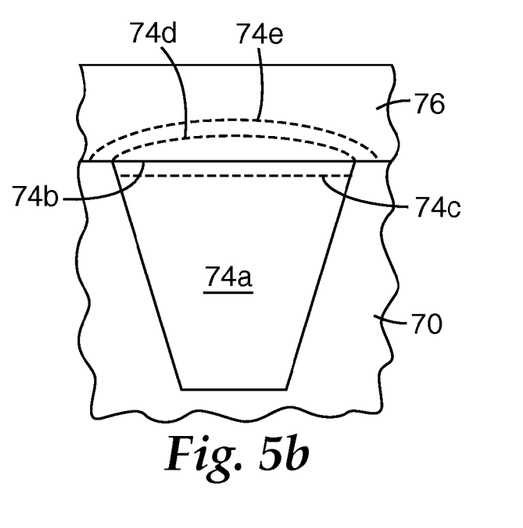

In some cases, depending on the characteristics of the glass used and the molding conditions used, coalescing of multiple glass particles to form a larger volume may produce a network of defects in the molded glass corresponding to the boundaries or surfaces of the constituent particles. Such defects can result in increased scattering or haze in the molded glass, or mechanical weakness or fracturing. In such cases, and in other cases where such defects are not problematic, it can be advantageous to control the size of the glass particles so that substantially only one glass particle is provided per mold cavity, thus avoiding coalescing or fusing of multiple particles within the cavities. FIGS. 5a and 5b depict a process that utilizes this concept.

In FIG. 5a, a mold 70 having a plurality of cavities 72 is provided. The mold is filled with a plurality of glass particles 74, whether by dispersing such particles over the mold and vibrating the mold so that one particle becomes lodged in each cavity, or by an individual pick-and-place technique. Regardless of technique, substantially only one particle 74 resides in any given cavity. The volume of particle 74 is selected to substantially match the volume of cavity 72. In some cases, particle 74 has a volume ranging from 70% to 110%, or even from 90% to 105%, of the cavity volume. Then, when the particle is softened upon heating above its glass transition temperature as shown in FIG. 5b, optionally with the application of pressure, it deforms into a molten extractor 74a that completely fills, or slightly underfills or slightly overfills, the cavity 72. The resulting top surface of such extractor 74a is depicted by surfaces 74b (complete fill), 74c (slight underfill), 74d (slight overfill), and 74e (greater overfill). After cooling of the glass, a land layer 76 is formed of the same glass or a different glass, or of another material as discussed above, so that the array of extractors 74a can be removed from the mold 70.

In other cases, particle 74 can be substantially larger, e.g., its volume can be 150% or 200% of the cavity volume, and the cavities can be arranged to be sufficiently close to each other so that when the particles deform during the heating step, the excess molten glass material from the larger particles not only completely fills the cavities but flows outward from the cavities, with excess molten material from neighboring cavities joining together to form a continuous molten land layer.

The particle 74 may be spherical in shape, as produced by flame forming of glass feedstock. Alternatively, the particle 74 can be elongated or even pre-molded to approximate the shape or aspect ratio of the cavity 72 as shown in FIG. 5a, in order to speed up the molding process.

Figure 6A:
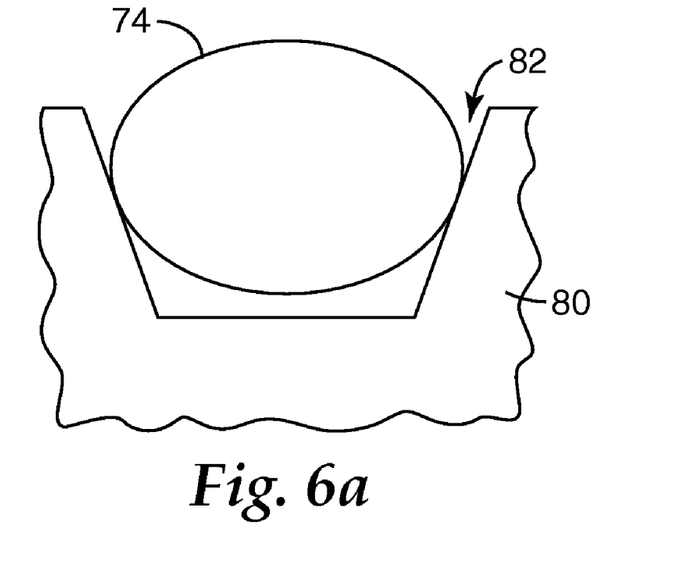
FIG. 6 shows a close-up view of the glass particle of FIG. 5 in another mold cavity, and where the size or volume of the particle is again adequate to substantially fill the cavity after molding.
Figure 6B:
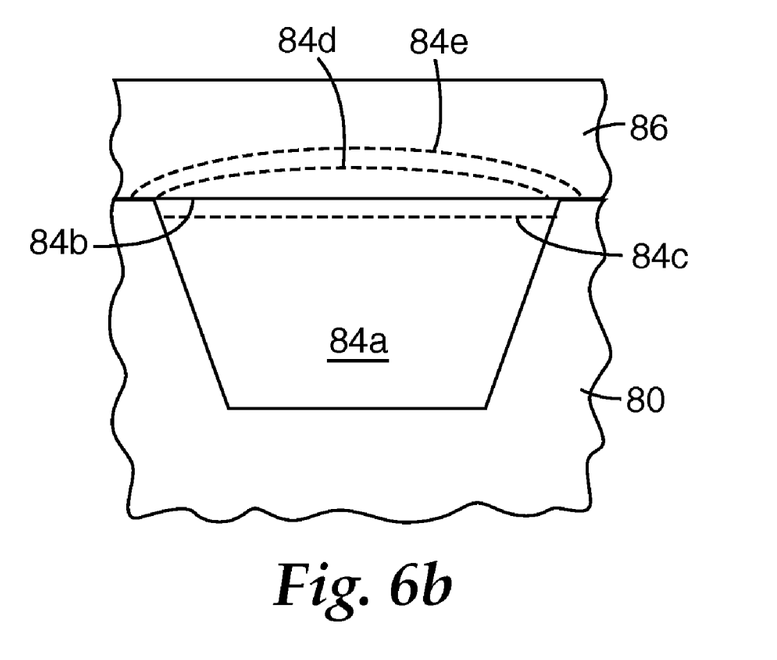

FIGS. 6a and 6b depict the processing of the elongated glass particles 74 in a mold 80 having an array of cavities 82, the mold 80 being similar to mold 70 but where the cavities 82 have a different aspect ratio than (but potentially the same volume as) cavities 72. Note that the elongated particle 74 can reorient itself to approximate the cavity 82 aspect ratio. When the particle 74 is softened upon heating above its glass transition temperature as shown in FIG. 6b, optionally with the application of pressure, it deforms into a molten extractor 84a that completely fills, or slightly underfills or slightly overfills, the cavity 82. The resulting top surface of such extractor 84a is depicted by surfaces 84b (complete fill), 84c (slight underfill), 84d (slight overfill), and 84e (greater overfill). After cooling of the glass, a land layer 86 is formed of the same glass or a different glass, or of another material as discussed above, so that the array of extractors 84a can be removed from the mold 80.

In a first specific embodiment, a graphite mold (Poco EDM3 grade) was fabricated using a wire EDM machine. Four identical cavities, each having a truncated cone shape, were machined out of the mold center. The cavities were arranged in a square pattern, with an 8 mm center-to-center distance along each side of the square. Each cone was 3 mm deep and had a bottom flat circular surface of 0.56 mm diameter, a circular aperture or opening of 2.9 mm diameter, and a taper (half-cone) angle of 21 degrees. The calculated volume of this truncated cone is 7.97 cubic mm. The wire EDM produced cavity walls (the tapered side wall and the bottom flat circular surface) having a surface finish $R_a$ of about 1.2 micrometers. The bottom 0.56 mm diameter circular surface was selected to produce a flat extractor input surface of the same size, which configuration was determined beneficial for coupling to a larger 1 mm by 1 mm emitting surface of a flip-chip LED die.

Irregular pieces or shards of S-LAH51 glass from Ohara Corporation were then selected for filling the mold. This glass has a density of 4.40 g/cc, a refractive index of about 1.786, and a transformation temperature $T_g$ of 617° C. Into a first cavity was placed a single piece of the glass weighing 0.0318 g, the piece having a calculated volume of 7.23 cubic millimeters, or 91% of the cavity volume. Into a second cavity was placed a single piece of the glass weighing 0.0378 g, having a calculated volume of 8.59 cubic millimeters, or 108% of the cavity volume. Into the third cavity was placed three similarly sized pieces of the glass, these pieces having a collective weight of 0.0367 g and a collective calculated volume of 8.34 cubic millimeters, or 105% of the cavity volume. Into the fourth cavity was placed a single piece of the glass weighing 0.0362 g, having a calculated volume of 8.23 cubic millimeters, or 103% of the cavity volume.

This filled mold was then placed in a tube furnace and heated according to a specific temperature profile. The atmosphere in the furnace was a slow bleed of forming gas (a mixture of 5% hydrogen, 95% nitrogen), i.e., a reducing atmosphere. No external pressure was applied to the glass pieces during heating. The temperature profile was as follows: 80 minute ramp from room temperature (about 25° C.) to 700° C.; hold at 700° C. for 15 minutes; 30 minute ramp from 700 to 800° C.; hold at 800° C. for 20 minutes; 60 minute ramp from 800 to 610° C.; hold at 610° C. for 15 minutes; 25 minute ramp from 610 to 555° C.; hold at 555° C. for 20 minutes; 75 minute ramp from 555° C. to room temperature.

This heating and cooling profile caused the glass particles to soften and deform within their respective cavities and then solidify to form extractors. The tops and bottoms of the extractors, corresponding respectively to the 2.9 mm diameter opening and the 0.56 mm diameter bottom surface of the cavities, exhibited curvature that was believed to be due to surface tension of the molten glass coupled with the absence of any applied pressure. The extractors were observed to be light-transmissive, but somewhat hazy or light-scattering possibly as the result of the reducing atmosphere.

Desirably, the extractors would undergo the following additional processing steps. While the extractors are still in the mold, a rigid land layer can be formed as described above, e.g. using paraffin wax. The extractors can then be removed from the mold while maintaining their relative orientation. The bottoms of the extractors can be simultaneously ground flat and polished to an optical finish (e.g. $R_a$ of 50 nm or 25 nm or less), and then singulated and separately attached or otherwise coupled to individual LED dies having 1 mm by 1 mm emitting surfaces.

In a second specific embodiment, the same graphite mold as in the first specific embodiment was used. Irregular pieces or shards of the same S-LAH51 glass from Ohara Corporation were again selected for filling the mold, but the masses or volumes of the pieces were chosen to significantly overfill each cavity (but not enough to form a continuous land layer between cavities). Into a first cavity was placed a single piece of the glass weighing 0.0655 g, the piece having a calculated volume of 14.89 cubic millimeters, or 187% of the cavity volume. Into a second cavity was placed a single piece of the glass weighing 0.0644 g, having a calculated volume of 14.64 cubic millimeters, or 184% of the cavity volume. Into the third cavity was placed three similarly sized pieces of the glass, these pieces having a collective weight of 0.0645 g and a collective calculated volume of 14.66 cubic millimeters, or 184% of the cavity volume. Into the fourth cavity was placed two similarly sized pieces of the glass, the pieces having a collective weight of 0.0725 g and a collective calculated volume of 16.48 cubic millimeters, or 207% of the cavity volume.

This filled mold was then placed in the tube furnace and heated according to a somewhat different temperature profile. The atmosphere in the furnace was a slow bleed of 100% nitrogen gas. No external pressure was applied to the glass pieces during heating. The temperature profile was as follows: 110 minute ramp from room temperature (about 25° C.) to 850° C.; hold at 850° C. for 20 minutes; 60 minute ramp from 850 to 610° C.; hold at 610° C. for 10 minutes; 25 minute ramp from 610 to 555° C.; hold at 555° C. for 10 minutes; 75 minute ramp from 555° C. to room temperature.

This heating and cooling profile caused the glass particles to soften and deform within their respective cavities and then solidify to form extractors. The extractors formed in this second specific embodiment were similar to those of the first embodiment, except the extractors of the second embodiment exhibited a pronounced dome at the tops thereof as a result of the excess glass material compared to the amount of glass used in the first embodiment.

Desirably, the extractors of the second embodiment would likewise undergo the following additional processing steps. While the extractors are still in the mold, a rigid land layer can be formed as described above, e.g. using paraffin wax. The extractors can then be removed from the mold while maintaining their relative orientation. The bottoms of the extractors can be simultaneously ground flat and polished to an optical finish (e.g. $R_a$ of 50 nm or 25 nm or less), and then singulated and separately attached or otherwise coupled to individual LED dies having 1 mm by 1 mm emitting surfaces. In alternative embodiments, the mold material can be changed from graphite to another material such as CRYSTALOY brand ceramic from Industrial Ceramic Technology, Inc., Ann Arbor, Mich. (e.g. CRYSTALOY 2311 EDX, a silicon carbide whisker reinforced ceramic composite) or the like, capable of operation in an oxidizing atmosphere.

Unless otherwise indicated, all numbers expressing feature sizes, amounts, and physical properties used in the specification and claims are to be understood as being modified by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

The foregoing description is illustrative and is not intended to limit the scope of the invention. Variations and modifications of the embodiments disclosed herein are possible, and practical alternatives to and equivalents of the various elements of the embodiments would be understood to those of ordinary skill in the art upon study of this patent document. These and other variations and modifications of the embodiments disclosed herein may be made without departing from the spirit and scope of the invention. All patents and patent applications referred to herein are incorporated by reference in their entireties, except to the extent they are contradictory to the foregoing specification.

The invention claimed is:

1. A method for making an article having LED/extractor pairs, the method comprising:
   providing an LED array comprising a plurality of LEDs in a first fixed spatial relationship, each LED having a major emitting surface;
   making an extractor array body at least by:
      providing a mold having a plurality of cavities therein, each cavity being shaped to form an extractor having an input surface adapted to substantially mate with the major emitting surface of a given one of the LEDs, the cavities disposed in the mold in a second fixed spatial relationship tailored to match the first fixed spatial relationship;
      filling the mold with a plurality of glass particles;
      heating the glass particles above glass transition temperatures thereof so that the particles are reshaped to conform to the cavity shapes;
      cooling the heated glass to form at least portions of solid extractors; and
      during or after the cooling, forming a land layer that extends between the cavities, connects adjacent solid extractors, and maintains the solid extractors in the second fixed spatial relationship relative to each other to provide the extractor array body;
   removing the extractor array body from the mold; and
   coupling the extractor array body to the LED array such that the input surfaces of the solid extractors substantially mate with the major emitting surfaces of the LEDs.

2. The method of claim 1, further comprising:
aligning the extractor array body with the LED array.

3. The method of claim 1,
wherein the coupling is carried out such that each solid extractor couples light out of a corresponding one of the LEDs that would otherwise be totally internally reflected within such corresponding LED.

4. The method of claim 3, wherein the coupling further comprises contacting the input surface of each solid extractor with the corresponding LED.

5. The method of claim 3, wherein the coupling further comprises bonding the extractor array to the LED array.

6. The method of claim 3, wherein the LED array is in the form of a solid state wafer.

7. The method of claim 1, wherein the input surface of each of the solid extractors is flat.

8. The method of claim 1, wherein forming the land layer comprises filling the mold with a sufficient quantity of glass particles so that they overfill the mold cavities.

9. The method of claim 1, wherein the forming is carried out separately from the filling, heating, and cooling.

10. The method of claim 1, wherein a relative size of the cavities and the glass particles is such that more than one glass particle fills each cavity.

11. The method of claim 1, wherein the heating includes coalescing two or more glass particles within each cavity.

12. The method of claim 1, wherein a relative size of the cavities and the glass particles is such that a single glass particle substantially fills each cavity.

13. The method of claim 12, wherein the glass particles have an average particle volume and the cavities have an average cavity volume, and the average particle volume is from 70% to 110% of the average cavity volume.

14. The method of claim 1, wherein the heating also includes applying pressure to the glass particles.

15. The method of claim 1, wherein the forming includes pouring a hardenable material that covers and extends between the at least portions of solid extractors, and solidifying the hardenable material.

16. The method of claim 1, wherein the mold has at least one surface whose surface roughness $R_a$ is less than 50 nanometers (nm).

17. The method of claim 16, further comprising:
polishing a surface of each of the extractors while they are connected to the land layer.

18. The method of claim 1, wherein the glass particles are nonspherical.

19. The method of claim 1, wherein the glass particles are elongated.

* * * * *